(12) United States Patent
Shinohara

(10) Patent No.: US 6,873,474 B2
(45) Date of Patent: Mar. 29, 2005

(54) IMAGING LENS

(75) Inventor: Yoshikazu Shinohara, Saitama (JP)

(73) Assignee: Fujinon Corporation, Saitama (JP)

( * ) Notice: Subject to any disclaimer, the term of this patent is extended or adjusted under 35 U.S.C. 154(b) by 0 days.

(21) Appl. No.: 10/778,229

(22) Filed: Feb. 17, 2004

(65) Prior Publication Data
US 2004/0160680 A1 Aug. 19, 2004

(30) Foreign Application Priority Data
Feb. 19, 2003 (JP) ........................... 2003-041258

(51) Int. Cl.[7] ............... G02B 3/02; G02B 13/18; G02B 9/06
(52) U.S. Cl. ......................... 359/717; 359/794
(58) Field of Search ............... 359/708, 717, 359/753, 794

(56) References Cited
U.S. PATENT DOCUMENTS
6,650,485 B2 * 11/2003 Shinohara ............... 359/717
6,813,101 B2 * 11/2004 Sato ...................... 359/794

FOREIGN PATENT DOCUMENTS
JP  H1-245211   9/1989
JP  H4-211214   8/1992

* cited by examiner

Primary Examiner—Georgia Epps
Assistant Examiner—Alicia M. Harrington
(74) Attorney, Agent, or Firm—Arnold International; Bruce Y. Arnold

(57) ABSTRACT

An imaging lens having a two-group, two-lens-element construction is disclosed that is formed of, in order from the object side without any intervening lens elements: an aperture stop; a first lens element of positive refractive power with its surface on the object side being aspherical and convex near the optical axis and its surface on the image side being aspherical and either convex or concave near the optical axis; and a second lens element of positive refractive power with its surface on the object side being aspherical and convex near the optical axis and its surface on the image side being aspherical and concave near the optical axis but convex toward the periphery. Specified conditions are satisfied in order to reduce various aberrations and provide a sufficient back focus for the insertion of other optical elements.

4 Claims, 4 Drawing Sheets

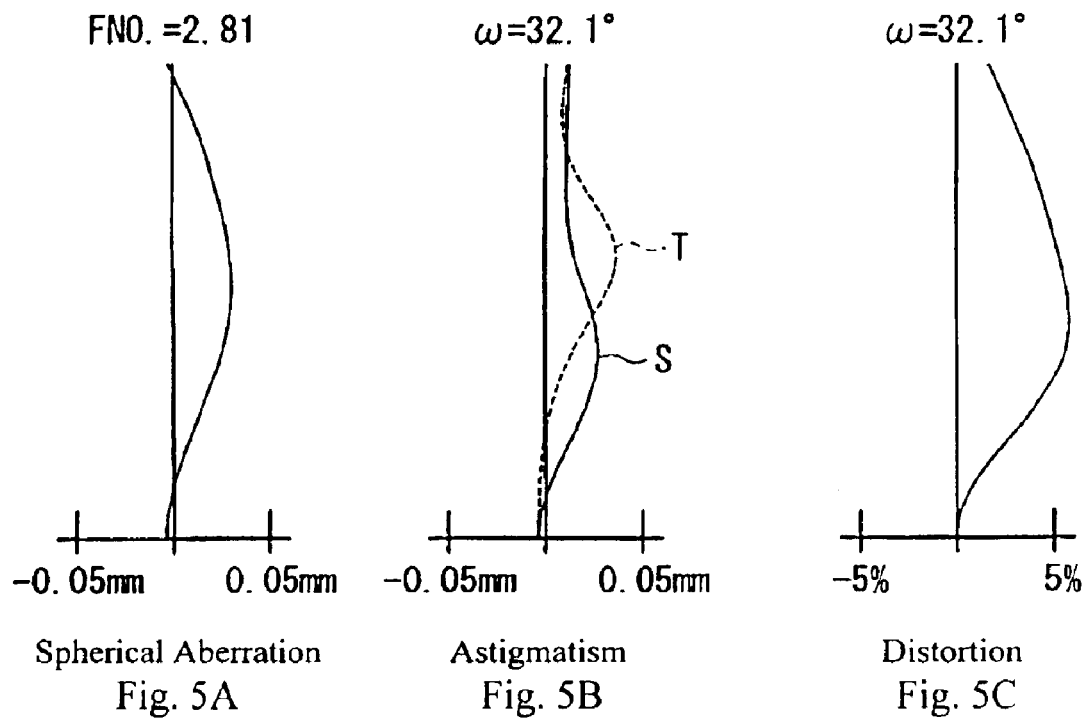
Fig. 5A Spherical Aberration
Fig. 5B Astigmatism
Fig. 5C Distortion
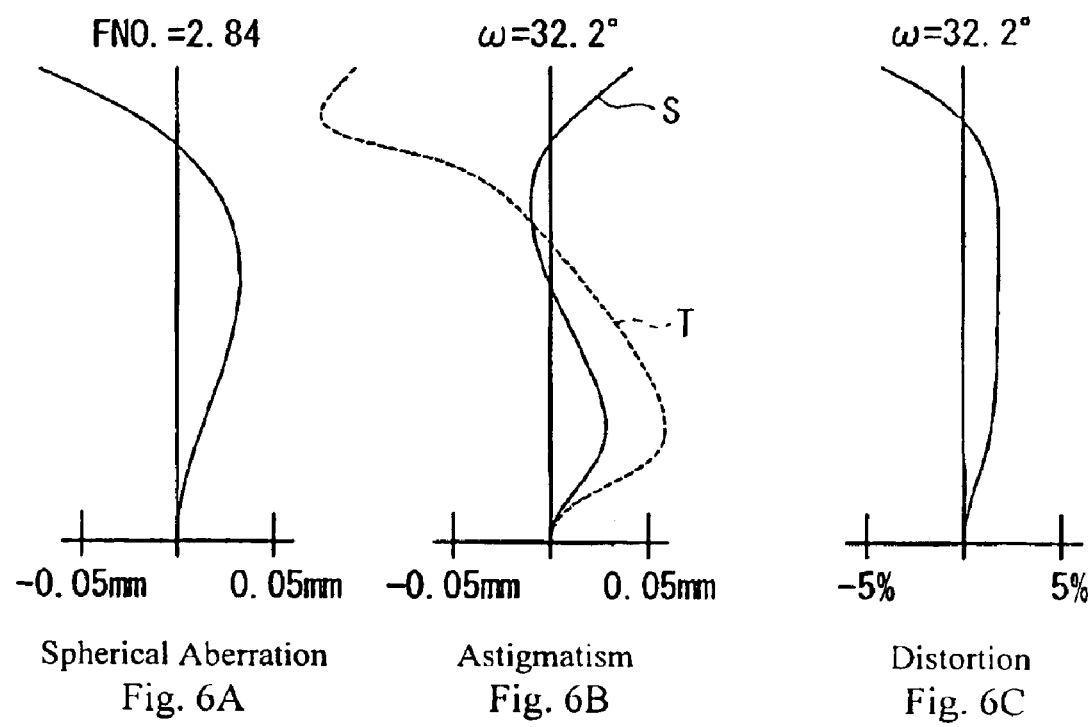
Fig. 6A Spherical Aberration
Fig. 6B Astigmatism
Fig. 6C Distortion Spherical Aberration Astigmatism Distortion Spherical Aberration Astigmatism Distortion

IMAGING LENS

BACKGROUND OF THE INVENTION

Conventionally known image detecting device types are a CCD (Charge Coupled Device) and a CMOS (Complementary Metal Oxide Semiconductor). In such image detecting devices, taking a picture is performed by forming an image of an object on a detecting surface of the image detecting device so as to capture an image, and then the image data is electronically read (i.e., output). Such image detecting devices have enabled significant miniaturization of the structure used to form the image, resulting in significant miniaturization overall.

Especially, module cameras and digital still cameras for image input in portable telephones (simply called digital cameras below) have achieved notable miniaturization. Conventionally, imaging lenses used in these compact imaging devices often have been constructed of a single lens element, placing importance on compactness and portability.

However, while miniaturization of imaging devices has been occurring, an increase in the number of pixels and an increase in image size have also been occurring as the state of the art advances. Therefore, higher optical performance of imaging lenses than needed in the prior art has recently also been required of imaging lenses to be used with state-of-the-art image detecting devices, making it difficult to provide sufficient correction of aberrations when the imaging lens consists of a single lens element.

In order to obtain a sufficiently high optical performance that matches the image capturing performance of state-of-the-art image detecting devices, an imaging lens of a two-piece construction has been disclosed, for example, in Japanese Patent No. 2650309 and in Japanese Patent No. 3007695. However, while the image performance can be enhanced by increasing the number of lenses, the overall length of the imaging lens tends to be larger for an imaging lens having a two-piece construction as compared with a one-piece construction. Moreover, it is difficult to regard the imaging lens described in the above-mentioned Japanese patents as having a sufficiently compact construction. Therefore, when this kind of imaging lens is mounted in an imaging device, compactness/portability may be lost, requiring further improvements. Also, when mounting an imaging lens in an imaging device in general, an optical element such as an infrared blocking filter and a cover glass are often placed between the final surface of the imaging lens and the image detecting device. Therefore, in order to assure that there is sufficient space for these optical elements while achieving compactness of the overall length of the device, it becomes necessary to specify a minimal back focal length so that there is a sufficient back focus.

BRIEF SUMMARY OF THE INVENTION

The present invention relates to an imaging lens mounted to a relatively compact imaging device and provides an imaging lens having a compact construction and a performance that is optimized for high-pixel imaging elements.

BRIEF DESCRIPTION OF THE DRAWINGS

The present invention will become more fully understood from the detailed description given below and the accompanying drawings, which are given by way of illustration only and thus are not limitative of the present invention, wherein:

FIGS. 5A–5C show the spherical aberration, astigmatism, and distortion, respectively, of the imaging lens of Embodiment 1;

FIGS. 6A–6C show the spherical aberration, astigmatism, and distortion, respectively, of the imaging lens of Embodiment 2;

DETAILED DESCRIPTION

Figure 1:
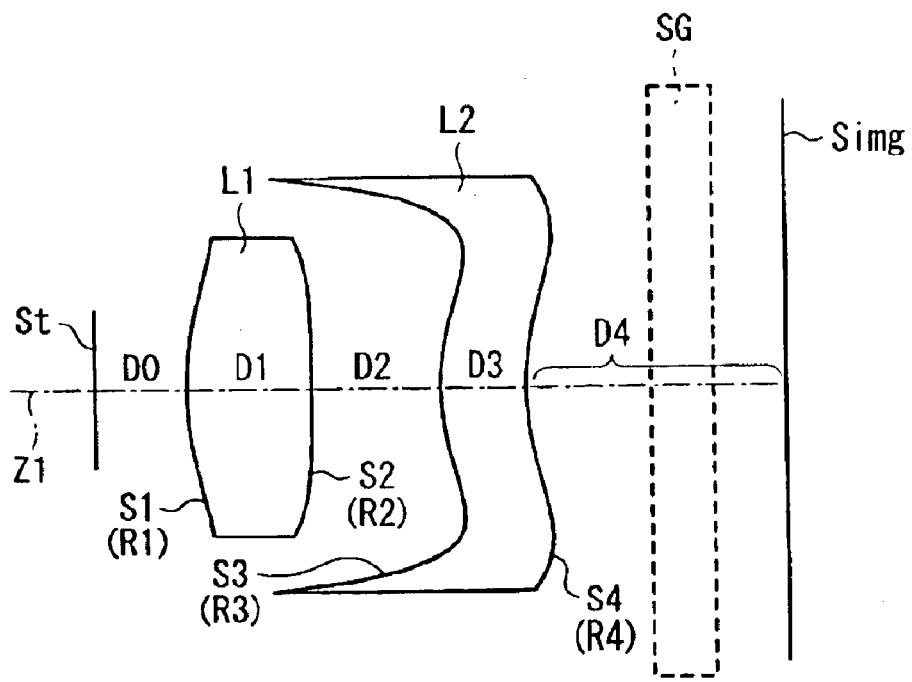
FIG. 1 is a cross section of an imaging lens according to Embodiment 1.

The imaging lens of the present invention has a two-group, two-lens-element construction. More specifically, it includes, in order from the object side: an aperture stop, a first lens element, and a second lens element. The first lens element has positive refractive power near the optical axis, with an object-side surface that is aspherical and convex near the optical axis. The surface on the image side is aspherical and either convex or concave near the optical axis. The second lens element has positive refractive power with its surface on the object-side being aspherical and convex near the optical axis. The surface of the second lens element oil the image side is aspherical and concave near the optical axis, but becomes convex in its peripheral region. In addition, the following Conditions (1) and (2) are satisfied:

$$0.6 \leq D3/D2 \leq 1.0 \qquad \text{Condition (1)}$$

$$\upsilon 1, \upsilon 2 \geq 50 \qquad \text{Condition (2)}$$

where

D3 is the central thickness of the second lens element,

D2 is the distance on the optical axis between the image-side surface of the first lens element and the object-side surface of the second lens element, $\upsilon 1$ is the Abbe number of the first lens element, and $\upsilon 2$ is the Abbe number of the second lens element.

In the imaging lens of the present invention, because it has the referenced construction, miniaturization is achieved, the various aberrations are favorably corrected, and thus the optical performance is enhanced compared with prior art imaging lenses of one-piece construction. By satisfying Condition (1) curvature of field is suppressed and distortion is favorably corrected, and by satisfying Condition (2) it becomes especially easy to correct on-axis chromatic aberration.

In the imaging lens of the present invention, it is further desirable that it is constructed to satisfy the following Condition (3):

$$1.48 \leq Bf/D2 \leq 2.3 \qquad \text{Condition (3)}$$

where

Bf is the back focal length of the imaging lens, namely, the distance from the image-side surface of the second lens element to the image plane.

By satisfying Condition (3), it becomes easier to secure a sufficient space between the final lens element surface and the image plane, and the curvature of field is suppressed.

In the imaging lens of the present invention, it is desirable that the aspherical shape of the object-side surface and the image-side surface of the second lens element be defined using at least one non-zero, odd-order coefficient Ai, where the aspherical shape of the surface is defined using the following Equation (A):

$$Z = C\rho^2/(1+(1-K\,C^2\rho^2)^{1/2}) + \Sigma A_i \rho^i \qquad \text{Equation (A)}$$

where

Z is the length of a perpendicular line drawn from a point on an aspherical surface at a height ρ from the optical axis to the contact plane (a plane perpendicular to the optical axis) of the apex of the aspherical surface, ρ is the distance from the optical axis, K is a constant, C is the paraxial curvature of the aspherical surface (=1/R, where R is the radius of curvature of the aspherical surface on-axis), and $A_i$ is the $i^{th}$ order aspherical coefficient, where i equals 3 through 10.

By defining the shapes of the object-side surface and the image-side surface of the second lens element using at least one non-zero, odd-order coefficient $A_i$ in Equation (A) above, curvature of field is suppressed and distortion is more easily corrected.

The properties of the imaging lens of the present invention will vary somewhat depending on the particular image detecting device used. Thus, optimal optical performance for a given application will require selecting the lens element construction that is best suited for a given application.

The invention will first be discussed in general terms with reference to the drawings.

FIGS. 1–4 show construction examples of the imaging lens according to Embodiments 1–4, respectively, of the present invention. It should be noted that FIGS. 1–4 are for purposes of explanation and are not drawn to scale. In FIGS. 1–4, the labels (R1)–(R4) indicate the paraxial radius of curvature of the lens element surfaces S1–S4, in order from the object side, of the two lens elements L1 and L2, and the labels D1–D4 indicate the surface spacings along the optical axis Z1, as illustrated. D0 indicates the on-axis surface spacing of a stop St that is placed to the object side of the lens element surface S1 of lens element L1. Shown in broken lines in each of FIGS. 1–4 is a plane-parallel plate SG, such as a cover glass. The image plane is indicated by Simg.

Referring to FIG. 1, which is specifically representative of Embodiment 1 but also illustrates the following general features of the invention, the present invention is an imaging lens having a two-lens-element construction. In order from the object side along an optical axis Z1, there are: an aperture stop St, a first lens element L1 and a second lens element L2. An image detector such as a CCD, not shown, may be positioned at the image plane Simg of the imaging lens in order to capture the images of the imaging lens, and a plane-parallel plate SG such as a cover glass may be inserted between the second lens element L2 and the image plane Simg so as to protect optical filters and imaging elements that may also be inserted in this region.

For the imaging lens embodiment shown in FIG. 1, the first lens element L1 has positive refractive power, an object-side surface S1 that is aspherical and convex, and an image-side surface S2 that is aspherical. The image-side surface S2 is concave near the optical axis but the curvature becomes convex in its peripheral region. The second lens element L2 has positive refractive power, an object-side surface S3 that is aspherical and convex near the optical axis but the curvature becomes concave in its peripheral region, and an image-side surface S4 that is aspherical and concave near the optical axis but the curvature becomes convex near in its peripheral region.

Figure 2:
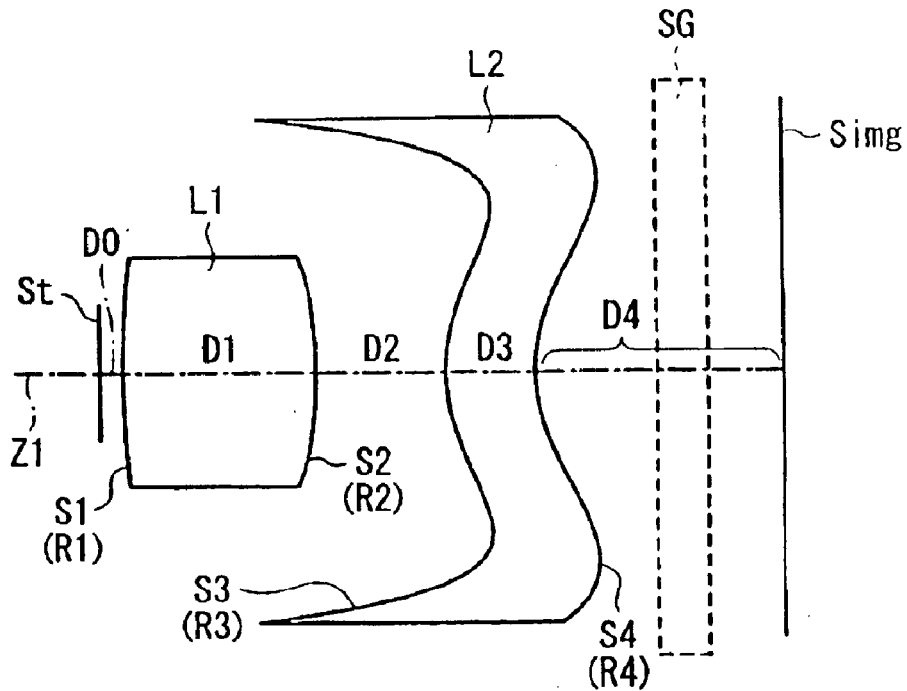
FIG. 2 is a cross section of an imaging lens according to Embodiment 2.
Figure 3:
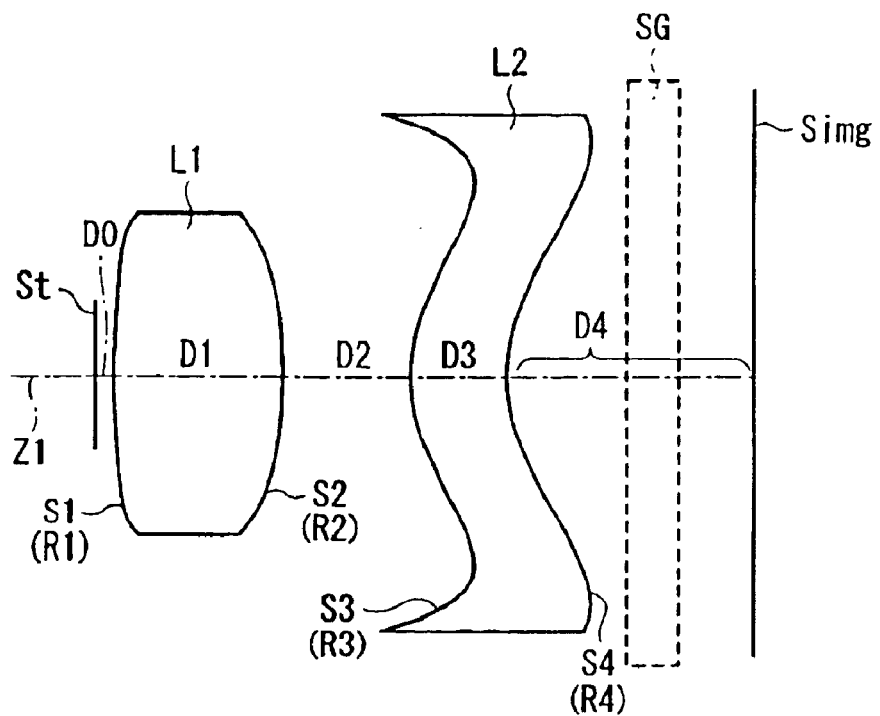
FIG. 3 is a cross section of an imaging lens according to Embodiment 3.
Figure 4:
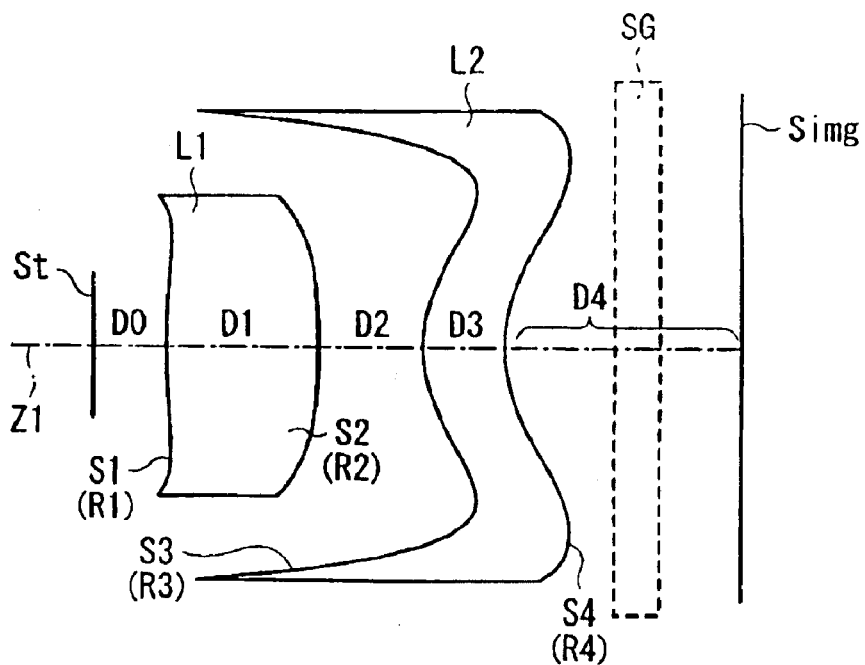
FIG. 4 is a cross section of an imaging lens according to Embodiment 4.

On the other hand, for the imaging lens embodiments shown in FIGS. 2–4, the first lens element L1 of positive refractive power has an object-side surface S1 that is aspherical and convex near the optical axis but the curvature may become concave in its peripheral region, and an image-side surface S2 that is aspherical and convex near the optical axis, but the curvature may become concave in its peripheral region. The imaging lenses shown in FIGS. 1–4 are further constructed so as to satisfy the above Conditions (1) and (2).

In addition, it is desirable that the imaging lens be constructed to satisfy the above Condition (3).

Furthermore, it is desirable that the aspherical shapes of the object-side surface S3 and the image-side surface S4 of the second lens element L2 are expressed using at least one odd-order aspherical coefficient Ai when the aspherical shape of the surface is expressed using Equation (A) above.

For the shapes of the first lens element L1 and the second lens element L2, one of the constructions shown in FIGS. 1–4 can be selected according to the particular application.

The actions and effects of the imaging lens of the present invention will now be discussed.

In the imaging lens of the present invention, because all four of the lens surfaces that constitute the two-group, two-lens-element construction are made to be aspherical in shape, various aberrations can be favorably corrected while achieving miniaturization. Also, because the aperture stop St is positioned at the most object side of the imaging lens, the overall length of the imaging lens can be shortened, and the light that is incident onto the image plane Simg can be made to be almost parallel to the optical axis Z1. In other words, the imaging lens can be made to be substantially telecentric while also providing for a compact construction. The reason it is desirable that the light that is incident onto the image plane be almost parallel to the optical axis Z1 is for more efficient detection of the light at the image plane when capturing images using an image detector, such as a CCD.

Having the object-side surface S1 of the first lens element L1 convex near the optical axis allows for the overall length of the imaging lens to be shortened as compared with the case where this surface is concave near the optical axis. Furthermore, having the image-side surface S4 of the second lens element L2 be an aspherical shape that is concave near the optical axis and becomes convex toward the periphery enables the curvature of field to be especially favorably suppressed.

Furthermore, because the constructions in FIGS. 1–4 satisfy Condition (1), distortion can be favorably corrected while suppressing the curvature of field. If the upper limit of Condition (1) is exceeded, the curvature of field becomes large in the positive direction, making it impossible to obtain good optical performance. On the other hand, if the lower limit of Condition (1) is not satisfied, although the distortion is advantageously reduced, the curvature of field becomes negative, making it impossible to obtain good optical performance. Also, because the thickness of the second lens element L2 becomes too thin, it becomes difficult to manufacture this lens element.

In addition, for the constructions shown in FIGS. 1–4, because Condition (2) relating to the Abbe numbers is satisfied, the on-axis chromatic aberration can be especially well corrected. However, because each of the first lens element L1 and the second lens element L2 have positive refractive power, if the lower limit of Condition (2) is not satisfied, it becomes difficult to correct the on-axis chromatic aberration of the imaging lens.

Furthermore, for the constructions shown in FIGS. 1–4, by satisfying Condition (3), a sufficient space between the final lens element surface S4 and the image plane Simg is assured, while shortening the overall length of the imaging lens. Satisfying Condition (3) also enables the curvature of field to be reduced. If the lower limit of Condition (3) is not satisfied, the distance between the final lens element surface S4 and the image plane Simg decreases to the extent that it becomes difficult to insert other optical components such as a lowpass filter, an 1R-blocking filter, etc. On the other hand, if the upper limit of Condition (3) is not satisfied, the back focal length Bf becomes too large, causing the overall length of the imaging lens to be excessive. In addition, when the upper limit of Condition (3) is exceeded, it becomes impossible to sufficiently correct the curvature of field.

In addition, for the constructions shown in FIGS. 1–4, when the aspherical shapes of the object-side surface S3 and the image-side surface S4 of the second lens element L2 are expressed using at least one odd-order aspherical coefficient Ai, it is easy to favorably correct distortion while suppressing the curvature of field. Furthermore, when the aspherical shapes of the object-side surface S3 and the image-side surface S4 of the second lens element L2 are expressed using only even-order aspherical coefficients Ai, correction of the curvature of field, especially in the tangential plane, tends to become insufficient.

In this way, because the imaging lens of the present invention is equipped with, in order from the object side, an aperture stop St, a first lens element L1, and a second lens element L2, with all four lens element surfaces being aspherical in shape, an optical image is produced having a quality sufficient for capture using a high-pixel image detecting device. Also, by selecting from among the constructions shown in FIGS. 1–4 according to the properties of the image detecting element used, an optical performance optimally matched to the properties of that image detecting element can be provided.

Four embodiments of the imaging lens of the invention will now be discussed in detail.

Embodiment 1

FIG. 1 shows a cross section of an imaging lens of the invention according to Embodiment 1.

Table 1 below lists the surface number #, in order from the object side, the radius of curvature R near the optical axis (in mm), the on-axis surface spacing D (in mm), as well as the index of refraction $N_d$ and the Abbe number $\nu_d$ (both at the d-line of 587.6 nm) of each lens element according to Embodiment 1. Those surfaces that are aspheric are listed with a *to the right of the surface number, and the aspheric surface shape is defined using Equation (A) above.

TABLE 1

| # | R | D | $N_d$ | $\nu_d$ |
|---|---|---|---|---|
| 0 | ∞ (stop) | 0.221 | | |
| 1* | 0.753 | 0.271 | 1.53105 | 55.5 |
| 2* | 3.289 | 0.287 | | |
| 3* | 0.522 | 0.219 | 1.53105 | 55.5 |
| 4* | 6.000 | 0.543 | | |

Table 2 below lists the values of the constant K and of the aspherical coefficients $A_3$–$A_{10}$ used in Equation (A) above for each of the aspherical surfaces indicated in Table 1. An "E" in the data indicates that the number following the "E" is the exponent to the base 10. For example, "1.0E-02" represents the number $1.0 \times 10^{-2}$.

TABLE 2

| | Surface #: | | | |
|---|---|---|---|---|
| | 1 | 2 | 3 | 4 |
| K | −5.876 | −1.215 | 3.371E−01 | −6.259E−01 |
| $A_3$ | 0.000 | 0.000 | −6.197E−01 | 1.461 |
| $A_4$ | 3.201E−01 | −4.040 | 5.519 | −1.033 |
| $A_5$ | 0.000 | 0.000 | −2.176E+01 | −1.085E+01 |
| $A_6$ | 5.713 | 2.005E+01 | −1.827E+01 | −2.121 |
| $A_7$ | 0.000 | 0.000 | 2.790E+01 | 1.624E+01 |
| $A_8$ | −3.762E+01 | −9.325E+01 | 4.552E+01 | −7.386E+01 |
| $A_9$ | 0.000 | 0.000 | 6.263E+02 | 2.459E+02 |
| $A_{10}$ | 7.196E+01 | 1.793E+02 | −1.687E+03 | −2.454E+02 |

FIGS. 5A–5C show the spherical aberration, astigmatism, and distortion, respectively, of the imaging lens of Embodiment 1. These aberrations are based on the d-line (wavelength=587.6 nm). In FIG. 5B, the astigmatism is shown for both the sagittal S and the tangential T image planes.

Embodiment 2

FIG. 2 shows a cross section of an imaging lens of the invention according to Embodiment 2.

Table 3 below lists the surface number #, in order from the object side, the radius of curvature R near the optical axis (in mm), the on-axis surface spacing D (in mm), as well as the index of refraction $N_d$ and the Abbe number $\nu_d$ (both at the d-line of 587.6 nm) of each lens element according to Embodiment 2. Those surfaces that are aspheric are listed with a * to the right of the surface number, and the aspheric surface shape is defined using Equation (A) above.

TABLE 3

| # | R | D | $N_d$ | $\nu_d$ |
|---|---|---|---|---|
| 0 | ∞ (stop) | 0.051 | | |
| 1* | 1.542 | 0.437 | 1.50869 | 56.0 |
| 2* | −1.513 | 0.293 | | |
| 3* | 0.380 | 0.206 | 1.53105 | 55.5 |
| 4* | 0.412 | 0.516 | | |

Table 4 below lists the values of the constant K and of the aspherical coefficients $A_3$–$A_{10}$ used in Equation (A) above for each of the aspherical surfaces indicated in Table 3. An "E" in the data indicates that the number following the "E" is the exponent to the base 10. For example, "1.0E-02" represents the number $1.0 \times 10^{-2}$.

TABLE 4

| | Surface #: | | | |
|---|---|---|---|---|
| | 1 | 2 | 3 | 4 |
| K | −6.735 | −1.216 | −1.276 | −2.467E−01 |
| $A_3$ | 0.000 | 0.000 | −3.611E−02 | 3.954E−01 |
| $A_4$ | −1.887 | −4.273 | 2.109 | 2.529 |
| $A_5$ | 0.000 | 0.000 | −9.780 | −1.810E+01 |
| $A_6$ | 1.490E+01 | 1.859E+01 | −7.210 | −6.025 |
| $A_7$ | 0.000 | 0.000 | 3.868E+01 | 6.950E+01 |
| $A_8$ | −7.046E+01 | −8.361E+01 | −7.064E+01 | −6.200E+01 |
| $A_9$ | 0.000 | 0.000 | 0.000 | 0.000 |
| $A_{10}$ | 1.042E+03 | −6.956E+01 | 0.000 | 0.000 |

FIGS. 6A–6C show the spherical aberration, astigmatism, and distortion, respectively, of the imaging lens of Embodiment 2. These aberrations are based on the d-line (wavelength=587.6 nm). In FIG. 6B, the astigmatism is shown for both the sagittal S and the tangential T image planes.

Figure 7A:
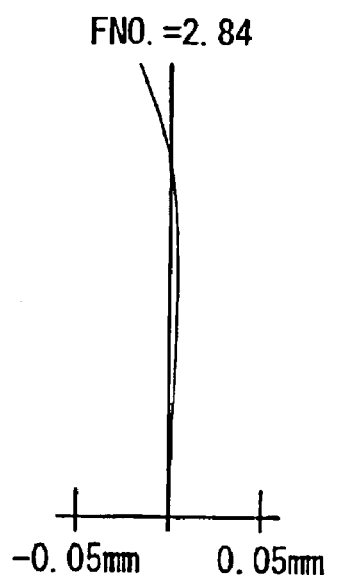
FIGS. 7A–7C show the spherical aberration, astigmatism, and distortion, respectively, of the imaging lens of Embodiment 3.
Figure 7B:
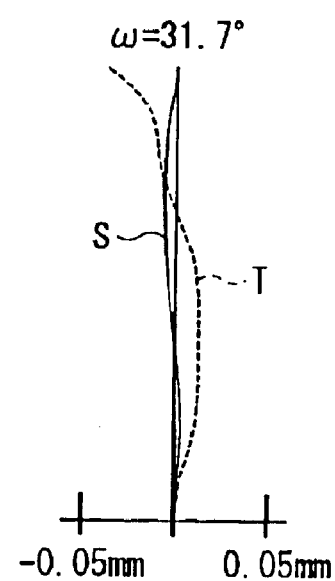
Figure 7C:
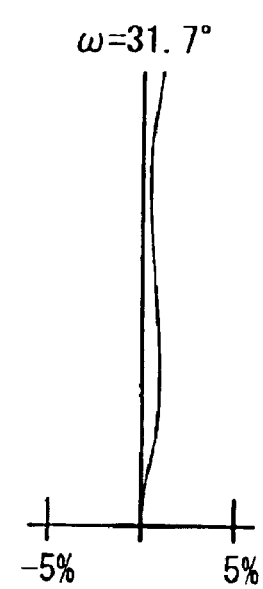

FIGS. 7A–7C show the spherical aberration, astigmatism, and distortion, respectively, of the imaging lens of Embodiment 3. These aberrations are based on the d-line (wavelength=587.6 nm). In FIG. 7B, the astigmatism is shown for both the sagittal S and the tangential T image planes.

Embodiment 3

FIG. 3 shows a cross section of an imaging lens of the invention according to Embodiment 3.

Table 5 below lists the surface number #, in order from the object side, the radius of curvature R near the optical axis (in mm), the on-axis surface spacing D (in mm), as well as the index of refraction $N_d$ and the Abbe number $\nu_d$ (both at the d-line of 587.6 nm) of each lens element according to Embodiment 3. Those surfaces that are aspheric are listed with a * to the right of the surface number, and the aspheric surface shape is defined using Equation (A) above.

Embodiment 4

FIG. 4 shows a cross section of an imaging lens of the invention according to Embodiment 4.

Table 7 below lists the surface number #, in order from the object side, the radius of curvature R near the optical axis (in mm), the on-axis surface spacing D (in mm), as well as the index of refraction $N_d$ and the Abbe numbered (both at the d-line of 587.6 nm) of each lens element according to Embodiment 4. Those surfaces that are aspheric are listed with a * to the right of the surface number, and the aspheric surface shape is defined using Equation (A) above.

TABLE 5

| # | R | D | $N_d$ | $\nu_d$ |
|---|---|---|---|---|
| 0 | ∞ (stop) | 0.043 | | |
| 1* | 1.687 | 0.387 | 1.50869 | 56.0 |
| 2* | −1.647 | 0.295 | | |
| 3* | 0.390 | 0.222 | 1.53105 | 55.5 |
| 4* | 0.450 | 0.534 | | |

TABLE 7

| # | R | D | $N_d$ | $\nu_d$ |
|---|---|---|---|---|
| 0 | ∞ (stop) | 0.184 | | |
| 1* | 1.411 | 0.381 | 1.53105 | 55.5 |
| 2* | −3.353 | 0.261 | | |
| 3* | 0.351 | 0.205 | 1.50869 | 56.0 |
| 4* | 0.434 | 0.563 | | |

Table 6 below lists the values of the constant K and of the aspherical coefficients $A_3$–$A_{10}$ used in Equation (A) above for each of the aspherical surfaces indicated in Table 5. An "E" in the data indicates that the number following the "E" is the exponent to the base 10. For example, "1.0E-02" represents the number $1.0 \times 10^{-2}$.

Table 8 below lists the values of the constant K and of the aspherical coefficients $A_3$–$A_{10}$ used in Equation (A) above for each of the aspherical surfaces indicated in Table 7. An "E" in the data indicates that the number following the "E" is the exponent to the base 10. For example, "1.0E-02" represents the number $1.0 \times 10^{-2}$.

TABLE 6

| | Surface #: | | | |
|---|---|---|---|---|
| | 1 | 2 | 3 | 4 |
| K | −6.738 | −1.215 | −1.295 | −1.640E−01 |
| $A_3$ | 0.000 | 0.000 | 7.379E−02 | 3.912E−01 |
| $A_4$ | −1.735 | −3.851 | 1.890 | 2.304 |
| $A_5$ | 0.000 | 0.000 | −8.140 | −1.429E+01 |
| $A_6$ | 1.208E+01 | 1.598E+01 | −5.722 | −4.628 |
| $A_7$ | 0.000 | 0.000 | 4.142E+01 | 6.004E+01 |
| $A_8$ | −5.586E+01 | −6.031E+01 | −5.334E+01 | −5.549E+01 |
| $A_9$ | 0.000 | 0.000 | 0.000 | 0.000 |
| $A_{10}$ | 7.476E+02 | −1.713E+01 | 0.000 | 0.000 |

TABLE 8

| | Surface #: | | | |
|---|---|---|---|---|
| | 1 | 2 | 3 | 4 |
| K | −7.079 | −1.281 | −7.206E−01 | 2.467E−01 |
| $A_3$ | 0.000 | 0.000 | −1.114E−01 | 7.245E−01 |
| $A_4$ | −1.639 | −4.931 | 1.911 | 2.489 |
| $A_5$ | 0.000 | 0.000 | −9.910 | −1.762E+01 |
| $A_6$ | 7.443 | 2.205E+01 | −6.427 | −6.560 |
| $A_7$ | 0.000 | 0.000 | 3.304E+01 | 3.996E+01 |
| $A_8$ | −1.325E+02 | −1.195E+02 | −3.763E+01 | −5.372E+01 |
| $A_9$ | 0.000 | 0.000 | −3.990E+01 | 1.798E+02 |
| $A_{10}$ | 1.024E+02 | 1.606E+02 | −2.796 | −2.018E+02 |

Figure 8A:
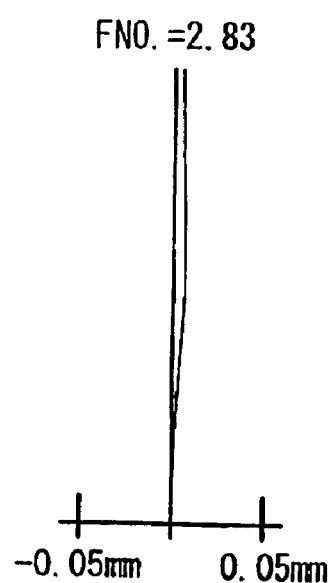
FIGS. 8A–8C show the spherical aberration, astigmatism, and distortivley, respectively, of the imaging lens of Embodiment 4.
Figure 8B:
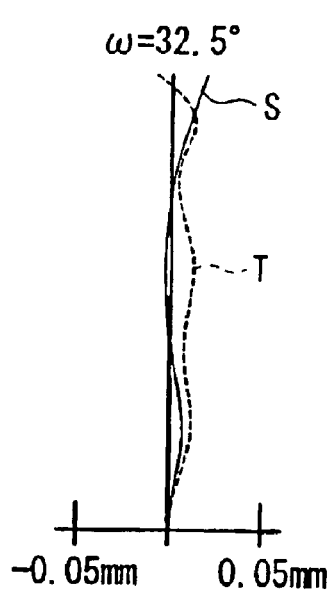
Figure 8C:
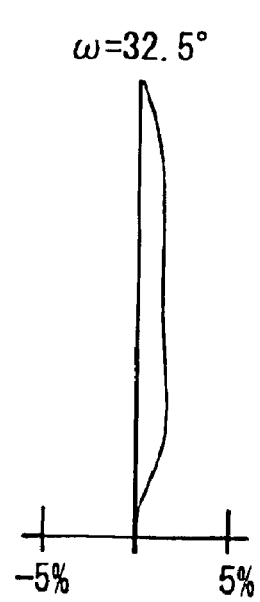

FIGS. 8A–8C show the spherical aberration, astigmatism, and distortion, respectively, of the imaging lens of Embodiment 4. These aberrations are based on the d-line (wavelength=587.6 nm). In FIG. 8B, the astigmatism is shown for both the sagittal S and the tangential T image planes.

Table 9 below lists the values of the ratios of Conditions (1) and (3) for each Embodiment.

TABLE 9

| | Embodiment | | | |
|---|---|---|---|---|
| | 1 | 2 | 3 | 4 |
| Condition (1) ratio: D3/D2 | 0.76 | 0.70 | 0.75 | 0.79 |
| Condition (3) ratio: Bf/D2 | 1.48 | 1.71 | 1.75 | 2.11 |

As is apparent from comparing the values listed in Table 9 with the acceptable ranges given in Conditions (1) and (3), each Embodiment satisfies Conditions (1) and (3). Furthermore, as shown in Tables 1, 3, 5, and 7, the Abbe numbers υ1 and υ2 of the first and second lens elements L1 and L2, respectively, satisfy Condition (2).

As shown in Tables 2, 4, 6, and 8, in Embodiments 1–4, the aspherical shapes of the surfaces S3 and S4 of the second lens element L2 are defined using multiple odd-order terms (i=3, 5, 7, and 9) and multiple even-order terms (i=4, 6, 8, and 10) as the aspherical coefficients Ai. On the other hand, the aspherical shapes of the surfaces S1 and S2 of the first lens element L1 are defined using only the even-order terms (i=4, 6, 8, and 10) since the odd-order terms have coefficients Ai that are zero.

As seen from the above lens data and aberration plots, the various aberrations are favorably corrected for each embodiment, and performance that is optimal for mounting the imaging lens of the present invention within compact imaging devices such as portable devices, etc., is obtained.

The invention being thus described, it will be obvious that the same may be varied in many ways. For example, the present invention is not limited to the above embodiments, as various modifications are possible. For example, the values for the radii of curvature R, on-axis surface spacings D, index of refraction $N_d$, and Abbe number $υ_d$ of each lens element are not limited to those shown above for each embodiment, as other values can be adopted.

Also, although the aspherical shapes of the surface S3 and the surface S4 of the second lens element L2 have been expressed using multiple odd-order terms as the aspherical coefficients Ai in the present embodiments it is also possible to use only one, or more than one, odd-order term(s). Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. An imaging lens having a two-group, two-lens-element construction, said imaging lens comprising, in order from the object side without any intervening lens element:

an aperture stop;

a first lens element of positive refractive power with its surface on the object side being aspherical and convex near the optical axis and its surface on the image side being aspherical and either convex or concave near the optical axis; and a second lens element of positive refractive power with its surface on the object side being aspherical and convex near the optical axis and its surface on the image side being aspherical and concave near the optical axis but convex toward the periphery;

wherein the following Conditions (1) and (2) are satisfied:

$0.6 \leq D3/D2 \leq 1.0$      Condition (1)

$υ1, υ2 \geq 50$      Condition (2)

where

D3 is the central thickness of the second lens element,

D2 is the distance on the optical axis between the image-side surface of the first lens element and the object-side surface of the second lens element, υ1 is the Abbe number of the first lens element, and υ2 is the Abbe number of the second lens element.

2. The imaging lens of claim 1, wherein the following Condition (3) is satisfied:

$1.48 \leq Bf/D2 \leq 2.3$      Condition (3)

where

Bf is the back focal length of the imaging lens.

3. The imaging lens of claim 2, wherein the aspherical shape of the object-side surface and the image-side surface of the second lens element are defined using at least one odd-order coefficient Ai in the following Equation (A):

$$Z = C\rho^2/(1+(1-K\,C^2\rho^2)^{1/2}) + \Sigma A_i \cdot \rho^i \qquad \text{Equation (A)}$$

where

Z is the length of a perpendicular line drawn from a point on an aspherical surface at a height $\rho$ from the optical axis to the contact plane (a plane perpendicular to the optical axis) of the apex of the aspherical surface, $\rho$ is the distance from the optical axis, K is a constant, C is the paraxial curvature of the aspherical surface (=1/R, where R is the radius of curvature of the aspherical surface on-axis), and $A_i$ is the $i^{th}$ order aspherical coefficient, where i equals 3 through 10.

4. The imaging lens of claim 1, wherein the aspherical shape of the object-side surface and the image-side surface of the second lens element are defined using at least one odd-order coefficient Ai in the following Equation (A):

$$Z = C\rho^2/(1+(1-K\,C^2\rho^2)^{1/2}) + \Sigma A_i \cdot \rho^i \qquad \text{Equation (A)}$$

where

Z is the length of a perpendicular line drawn from a point on an aspherical surface at a height $\rho$ from the optical axis to the contact plane (a plane perpendicular to the optical axis) of the apex of the aspherical surface, $\rho$ is the distance from the optical axis, K is a constant, C is the paraxial curvature of the aspherical surface (=1/R, where R is the radius of curvature of the aspherical surface on-axis), and $A_i$ is the $i^{th}$ order aspherical coefficient, where i equals 3 through 10.

* * * * *

UNITED STATES PATENT AND TRADEMARK OFFICE
CERTIFICATE OF CORRECTION

PATENT NO. : 6,873,474 B2
DATED : March 29, 2005
INVENTOR(S) : Shinohara

It is certified that error appears in the above-identified patent and that said Letters Patent is hereby corrected as shown below:

Column 2,
Line 36, change "oil" to -- on --; and

Column 5,
Line 13, change "1R-blocking" to -- IR-blocking --.

Signed and Sealed this

Fifth Day of July, 2005

JON W. DUDAS
*Director of the United States Patent and Trademark Office*